United States Patent [19]

Mendez et al.

[11] 4,420,932
[45] Dec. 20, 1983

[54] PRESSURE CONTROL SYSTEM FOR CONVERGENT-DIVERGENT EXHAUST NOZZLE

[75] Inventors: Juan A. Mendez, Miami; John L. Mayers, Lake Park, both of Fla.

[73] Assignee: The United States of America as represented by the Secretary of the Air Force, Washington, D.C.

[21] Appl. No.: 353,984

[22] Filed: Mar. 2, 1982

[51] Int. Cl.³ .............................................. F02K 1/18
[52] U.S. Cl. ....................... 60/230; 60/232; 60/242; 60/271; 239/265.39
[58] Field of Search ................. 60/228, 230, 232, 235, 60/236, 242, 271; 239/265.17, 265.35, 265.39, 265.41

[56] References Cited

U.S. PATENT DOCUMENTS

| | | | |
|---|---|---|---|
| 2,987,879 | 6/1961 | Brown | 60/35.6 |
| 3,214,904 | 11/1965 | Bailey et al. | 60/35.6 |
| 3,214,905 | 11/1965 | Beavers et al. | 60/35.6 |
| 3,398,896 | 8/1968 | Rabone | 60/232 X |
| 3,456,881 | 7/1969 | Beitler et al. | 239/265.19 |
| 3,487,993 | 1/1970 | Rannenberg | 60/39.07 X |
| 3,659,788 | 5/1972 | Oldfield et al. | 60/232 X |
| 3,722,797 | 3/1973 | Hammill | 239/265.17 |
| 3,897,907 | 8/1975 | Colley | 239/265.39 |
| 4,000,611 | 1/1977 | McCardle, Jr. et al. | 60/271 X |
| 4,000,854 | 1/1977 | Konarski et al. | 239/265.39 |
| 4,049,198 | 9/1977 | Maurer | 239/265.39 |
| 4,077,572 | 3/1978 | Fitzgerald | 239/265.17 |
| 4,203,286 | 5/1980 | Warburton | 60/266 |

*Primary Examiner*—Louis J. Casaregola
*Assistant Examiner*—Donald E. Stout
*Attorney, Agent, or Firm*—Donald J. Singer; Frank J. Lamattina

[57] ABSTRACT

A system to assist flap actuation of a convergent-divergent exhaust nozzle to overcome the high air loads on the flaps, so that the nozzle flaps can be properly positioned by the actuators. The structural members of the system are operatively associated with a controlled, air-pressurized, cavity positioned in the exhaust nozzle section. Pressurized air from the cavity acts against the flaps, and helps to overcome the load required to move them. The system is useful in any exhaust nozzle, and most particularly where the exhaust nozzle is two-dimensional, i.e., rectangularly shaped.

1 Claim, 2 Drawing Figures

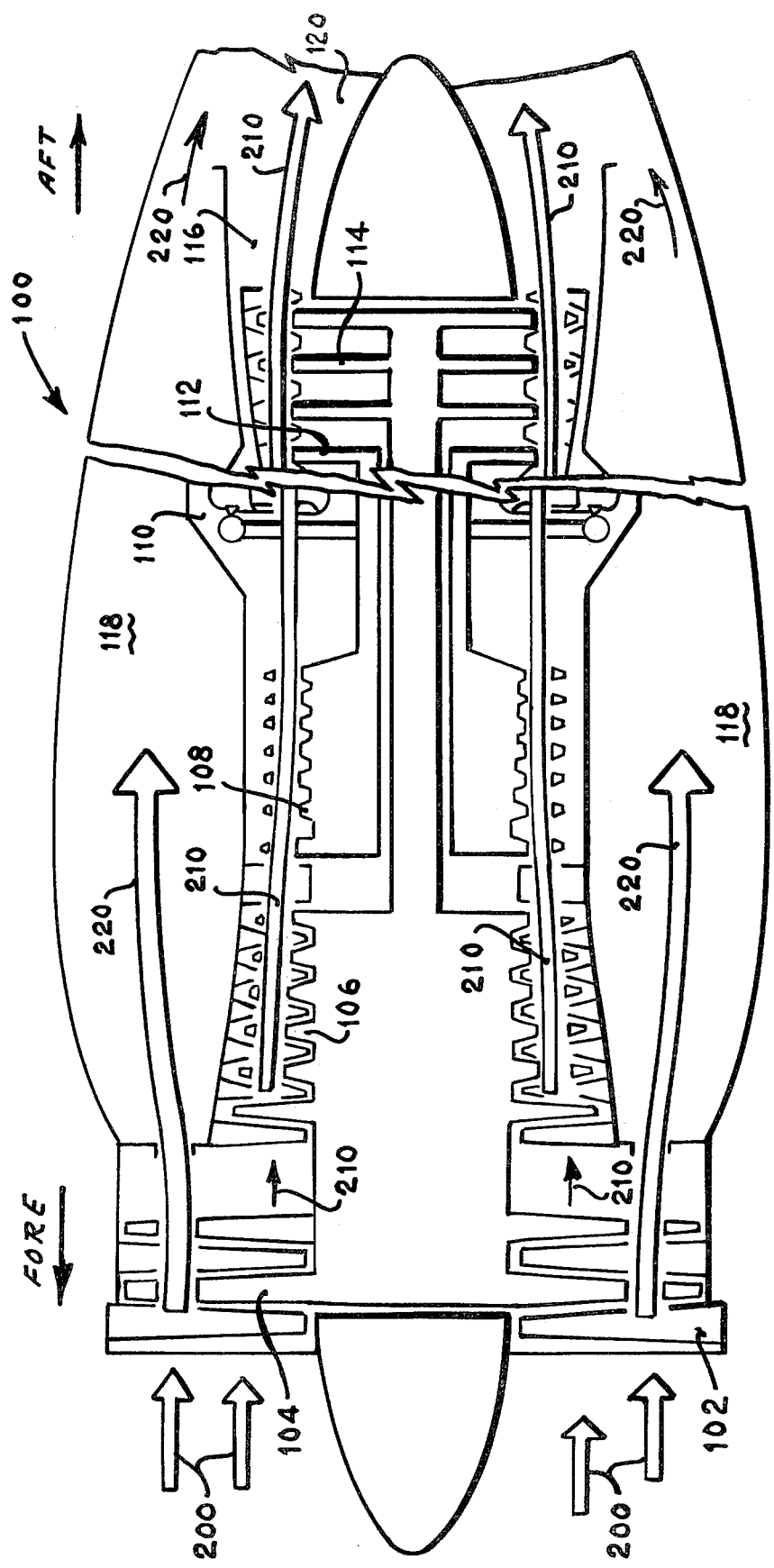

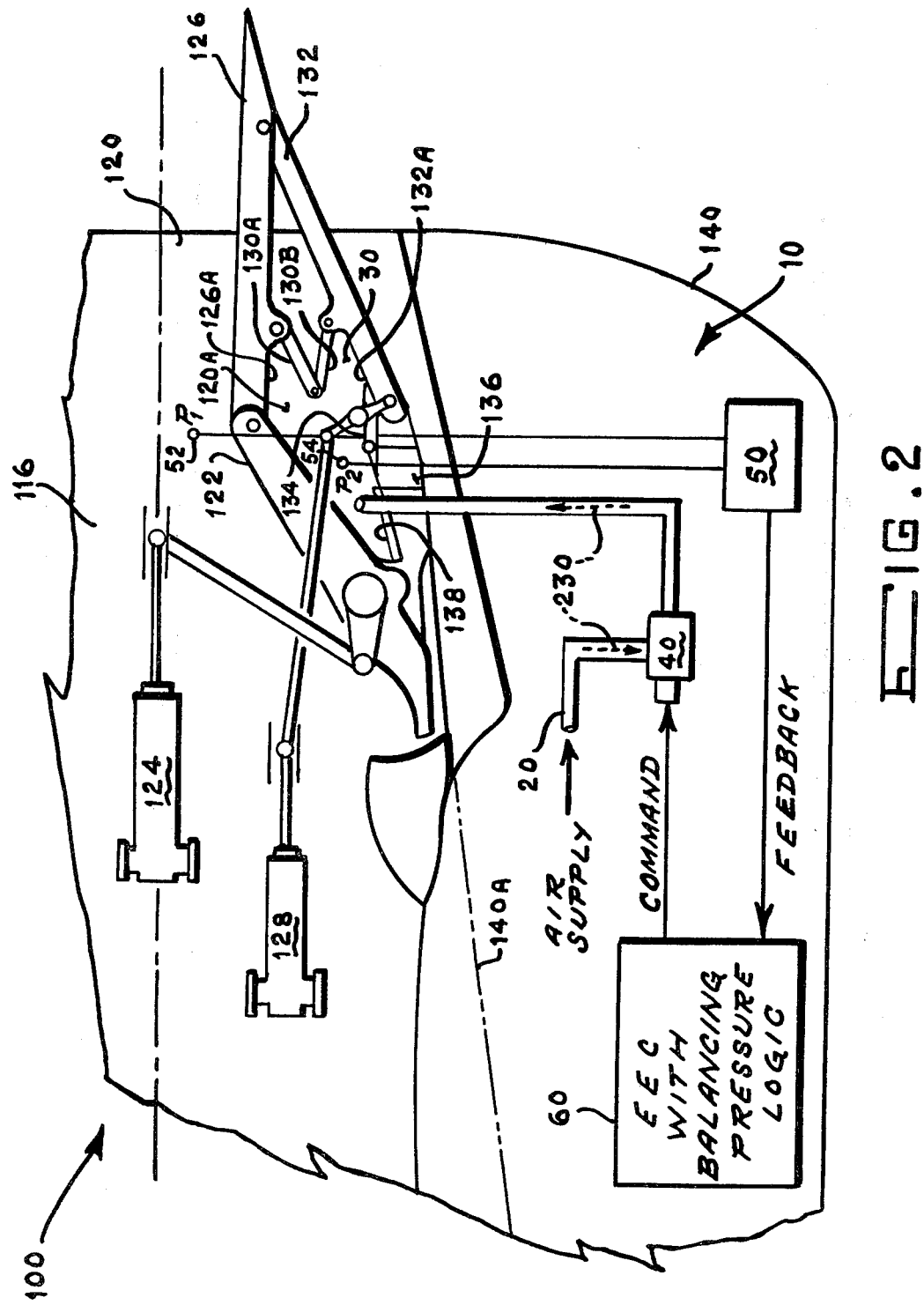

PRESSURE CONTROL SYSTEM FOR CONVERGENT-DIVERGENT EXHAUST NOZZLE

STATEMENT OF GOVERNMENT INTEREST

The invention described herein may be manufactured and used by or for the Government for governmental purposes without the payment of any royalty thereon.

BACKGROUND OF THE INVENTION

The instant invention relates to a pressure control system for a convergent-divergent exhaust nozzle of a gas turbine engine, and more particularly to a jet aircraft turbofan engine having either an axi-symetrical (i.e., round) or a 2D (i.e., rectangular) exhaust nozzle.

It is well known that in some applications a jet aircraft turbofan engine having a 2D exhaust nozzle is better suited than one having an axi-symetrical one. One of the advantages of 2D nozzles over axi-symetrical ones is that 2D nozzles can be "vectored" more easily. That is, the trailing edges of the 2D nozzle can be moved either up or down. This deflection of thrust can be used to reduce take-off and landing distances, and increase maneuverability of the aircraft.

It is equally well known that a current significant problem with 2D nozzles is the extremely high air loads which the nozzle flaps actuation system must overcome to properly position the nozzle flaps.

SUMMARY OF THE INVENTION

The instant invention eliminates the aforesaid current significant problem with 2D exhaust nozzles of gas turbine engines. It does so by providing a pressure control system which includes the use of a controlled pressurized cavity which is positioned in the exhaust nozzle portion of the engine to provide balancing forces on the nozzle flaps. The pressure control system offsets the induced air loads and reduces the actuation system requirements. Studies show that, with the use of the instant invention, the actuation loads can be reduced to approximately 20% of their original magnitude, resulting in a 60% reduction in the actuation system weight which, in turn, directly translates into reduced costs and complexity.

Accordingly, it is an object of the instant invention to provide a unique pressure control system for a convergent-divergent exhaust nozzle of a gas turbine engine which helps overcome the extremely high air loads that the nozzle flaps actuation system of the engine must overcome to properly position the nozzle flaps.

It is another object of this invention to provide the aforesaid pressure control system which includes the use of a controlled pressurized cavity that is positioned in the exhaust nozzle portion of the engine (e.g., between the sidewalls of a 2D exhaust nozzle).

It is still another object of the instant invention to provide the aforesaid pressure control system which is also useable in a jet aircraft turbofan engine which has a high compressor and a low (i.e., fan) compressor.

It is yet another object of this invention to provide the aforesaid pressure control system which is useable in a jet aircraft turbofan engine which has either a 2D exhaust nozzle or an axi-symetrical exhaust nozzle.

These objects of the instant invention, as well as other objects related thereto (e.g., simplicity, reliability, and the like) will become readily apparent after a consideration of the description of the instant invention, together with reference to the contents of the Figures of the drawing.

DESCRIPTION OF THE DRAWING

FIG. 1 is a side elevation view, in simpllified schematic and pictoral form, partially fragmented and partially in cross section, of a typical jet aircraft turbofan engine having both a high and a low compressor; and FIG. 2 is a side elevation view, in simplified pictorial and schematic form, partially fragmented, of the exhaust nozzle portion (of the turbofan engine shown in FIG. 1), showing the preferred embodiment of the instant invention operably associated with the engine and, more particularly, with the engine exhaust nozzle.

DESCRIPTION OF THE PREFERRED EMBODIMENT

As a preliminary matter, reference is made to FIG. 1 wherein a typical jet aircraft engine 100 of the turbofan type is shown, with "Fore" and "Aft" designations to better orient the reader. The engine 100 includes the air inlet 102; the fan 104; the low (i.e., fan) compressor 106; the high compressor 108; the combustion section 110; the turbine 112 of the high compressor; the turbine 114 of the low (i.e., fan) compressor; and the exhaust nozzle portion 116 of the engine. Also shown is the intake air flow 200 which divides into the main jet air flow 210 (also referred to in the art as "compressor air flow"), and the fan duct bypass air flow 220 which moves aft in the fan duct 118 toward the exhaust nozzle portion 116, and then rejoins the main jet air flow 210 at the exhaust nozzle section 116.

With reference to FIG. 2, there is shown the preferred embodiment of the invention pressure control system 10, while operably associated with the exhaust nozzle section 116 of the turbofan engine 100, FIG. 1. It is here to be noted and remembered: that as a matter of preference, and not of limitation, the exhaust nozzle section 116 shown in FIG. 2 is of a 2D (i.e., rectangular) exhaust nozzle 120 having a (vertical) side wall 120A; and that, in the interest of maintaining simplicity of the drawing, only the lower half portion of the nozzle section is shown, with it being understood that the upper half portion of the nozzle section is identical to, and symetrical with, the lower half portion. The instant invention 10, a pressure control system for a convergent-divergent exhaust nozzle 120, FIGS. 1 and 2, includes suitable means (such as conduit 20, FIG. 2) for conveying air in the engine 100 to a cavity 30, FIG. 2, that is located at a preselected position in the exhaust nozzle portion 116, FIGS. 1 and 2, of the engine 100. The air may be conveyed by the conduit 20 from any convenient stage of either the fan compressor 106, FIG. 1, or the high pressure compressor 108, FIG. 1; and, in any event, the conveyed air 230 is from compressor air flow 210. In this regard it is to be noted that the air 230 in the caity 30, FIG. 2, is not static, but rather is in the flowing mode.

The preselected position of the cavity 30, which as hereinbefore stated is located in the exhaust nozzle area 116, is defined by the convergent flaps 122 (which are actuated by actuator 124), the forward end 126A of the divergent flaps 126 (which are actuated by actuator 128), the sealing flaps 130A and 130B which interlink the divergent flaps 126 and the external flaps 132, the forward end 132A of the external flaps 132, the cross beam-to-convergent flaps seal 138, and the side wall 120A of the 2D exhaust nozzle 120.

Operably connected to the air conveying means 20 is a suitable means, such as pressure control valve 40, FIG. 2, for controlling the pressure P₂ in the cavity 30.

Means for sensing the difference in pressure between the air 230 in the cavity 30 and the air 210,220 in the main exhaust flow is operably connected to the pressure control valve 40, and is in communication with the cavity 30. This differential pressure sensing means preferably includes an air pressure sensor 54 in the cavity 30, another air pressure sensor 52 in the main exhaust air flow 210, 220, with both sensors 52 and 54 connected to a differential pressure sensor 50.

Means for maintaining a predetermined difference in pressure between the conveyed air 230 in the cavity 30 and the air 210,220 in the main exhaust flow includes a device for controlling the operation of the engine 100, such as an electronic engine control (EEC) with balancing pressure logic, collectively designated 60, FIG. 2. This pressure differential maintaining means 60 is operably connected to the pressure control valve 40 and also to the differential pressure sensor 50.

As a matter of preference and of convenience, some of the major components of the instant invention 10 are positioned external of the engine 100 and internal of an aircraft fairing 140, (or other suitable housing), as can be seen in FIG. 2. The aircraft fairing 140 can be streamlined as desired by suitable location of the electronic engine control (EEC) 60 and other components. Dotted line 140A in FIG. 12 shows one such fairing. In this regard, it is to be noted that, although the legend "air supply" is shown external of the engine 100, it is to be remembered that the air supply is in fact ducted from internal of the engine 100 to external of it by suitable conventional means (such as an extension of conduit 20), and that the legend is so placed to maintain simplicity of the drawing.

MANNER AND USE OF THE PREFERRED EMBODIMENT

The manner of use, and of operation, of the preferred embodiment 10, FIG. 2, of the instant invention can be easily ascertained by any person of ordinary skill in the art, from the foregoing description, coupled with reference to the contents of the Figures of the drawing.

For others, the following explanation is given. Succinctly, the pressured cavity 30, FIG. 2 of the pressure control system 10 is used to reduce the induced air loads on the convergent flaps (such as 122, FIG. 2) and the divergent flaps (such as 126, FIG. 2) of the exhaust nozzle by providing balancing forces of the nozzle flaps which offset the induced air loads. More specifically, the necessary pressurization of the cavity 30 is controlled by the pressure control valve 40 which ports an air supply extracted from a convenient stage of either the low 106 or high 108 compressor, as required by commands from the electronic engine control (EEC) 60, FIG. 2. The balancing logic in the EEC 60 provides a favorable P₁-P₂ difference in pressure at all conditions in order to minimize the air loads on the nozzle flaps. The differential pressure sensor 50, FIG. 2, senses the actual P₁-P₂ difference, and provides the EEC 60, FIG. 2, with a feedback signal to close the control loop.

CONCLUSION

It is abundantly clear from all of the foregoing, and from the contents of the Figures of the drawing, that the stated objects of the instant invention, as well as other objects related thereto, have been achieved.

It is to be noted that, although there have been described and shown the fundamental features of the instant invention, as applied to a preferred embodiment 10, nevertheless various other embodiments, variations, substitutions, additions, omissions, and the like may occur to, and can be made by those of ordinary skill in the art. In this regard it is repeated and emphasized that, although the exhaust nozzle shown in FIG. 2 is a 2D (i.e., rectangular) nozzle, the instant invention 10 can be used with an axi-symetrical (i.e., round) nozzle.

What is claimed is:

1. A pressure control system for a rectangular convergent-divergent exhaust nozzle of a jet aircraft turbofan engine having exhaust nozzle flaps located within the main exhaust flow, said system comprising:
   a. means for providing a cavity located in said exhaust nozzle adjacent one side of said exhaust nozzle flaps, wherein said means includes and said cavity is defined by constituent convergent flaps of said exhaust nozzle flaps, by a forward end of constituent divergent flaps, by constituent sealing flaps of said exhaust nozzle flaps, by a forward end of constituent external flaps of said exhaust nozzle flaps, wherein said sealing flaps interlink said divergent flaps and said external flaps, by a cross-beam-to-convergent flaps seal of said exhaust nozzle flaps, and by a side wall of said rectangular convergent-divergent exhaust nozzle; and
   b. means, operably connected to said cavity, for controlling pressure within said cavity in relationship to induced loads applied to the other side of said nozzle flaps by said main exhaust flow during operation of said jet aircraft turbofan engine, wherein this pressure control means includes:
      (1) means, operably connected to said cavity, for conveying air into said cavity;
      (2) means, operably connected to said cavity and to said main exhaust flow, for sensing pressure difference between said pressure in said cavity acting on said one side of said nozzle flaps and pressure applied to said other side of said nozzle flaps by said main exhaust flow and for providing a signal in response thereto, wherein this pressure difference sensing and signalling means includes: an air pressure sensor in said cavity; another air pressure sensor in said main exhaust flow; and, a differential air pressure sensor connected to said air pressure sensor in said cavity and to said other air pressure sensor in said main exhaust flow;
      (3) means, operably connected to said air conveying means and to said cavity at a location therebetween, for controlling the pressure of air entering said cavity in response to said signal, wherein this entering air pressure control means includes a pressure control valve; and
      (4) means, operably connected to said pressure control valve and to said differential air pressure sensor, for maintaining a predetermined difference between the pressure of the air in said cavity and the pressure of the air in the main exhaust flow, wherein this means includes an electronic engine control with balancing pressure logic.

* * * * *